(12) United States Patent
Petersen et al.

(10) Patent No.: US 7,134,383 B2
(45) Date of Patent: Nov. 14, 2006

(54) PISTON ARRANGEMENT

(75) Inventors: Christian Petersen, Hattstedt (DE); Heinz Otto Lassen, Flensburg (DE); Marten Nommensen, Flensburg (DE); Frank Holm Iversen, Padborg (DK)

(73) Assignee: Danfoss Compressors GmbH, Flensburg (DE)

( * ) Notice: Subject to any disclaimer, the term of this patent is extended or adjusted under 35 U.S.C. 154(b) by 38 days.

(21) Appl. No.: 11/001,199

(22) Filed: Dec. 1, 2004

(65) Prior Publication Data
US 2005/0155489 A1 Jul. 21, 2005

(30) Foreign Application Priority Data
Dec. 3, 2003 (DE) .................. 103 56 396

(51) Int. Cl.
*F01B 31/08* (2006.01)
*F16J 1/22* (2006.01)
(52) U.S. Cl. .................. 92/186; 92/159; 92/188
(58) Field of Classification Search .................. 92/158, 92/159, 160, 186, 187, 188
See application file for complete search history.

(56) References Cited

U.S. PATENT DOCUMENTS

| 1,294,538 | A | * | 2/1919 | Rose ........................... 92/160 |
| 1,350,747 | A | | 8/1920 | Stenger ...................... 92/188 |
| 1,637,765 | A | * | 8/1927 | Comstock ................... 92/160 |
| 1,763,625 | A | | 6/1930 | Mellor ........................ 92/186 |
| 1,787,638 | A | * | 1/1931 | Moore ......................... 92/160 |
| 2,289,251 | A | * | 7/1942 | Donaldson .................. 92/160 |
| 2,317,004 | A | * | 4/1943 | Wallgren et al. ............... 92/187 |
| 2,369,500 | A | * | 2/1945 | Wacber ........................ 92/186 |
| 2,451,216 | A | | 10/1948 | Halfvarson .................. 309/20 |
| 2,819,936 | A | * | 1/1958 | Cambeis ...................... 92/187 |
| 3,473,444 | A | | 10/1969 | Leffers ......................... 92/176 |
| 3,482,487 | A | | 12/1969 | Leffers ......................... 92/176 |
| 4,070,122 | A | | 1/1978 | Wisner ......................... 403/39 |
| 4,913,001 | A | | 4/1990 | Watanabe et al. ............. 74/579 |
| 4,938,121 | A | | 7/1990 | Melchior ..................... 92/110 |
| 5,137,431 | A | | 8/1992 | Kiyoshi et al. ............. 417/269 |
| 5,305,684 | A | | 4/1994 | Melchior ..................... 92/186 |
| 5,669,285 | A | * | 9/1997 | Wiczynski et al. ........... 92/187 |
| 6,006,652 | A | | 12/1999 | Peng ............................ 92/71 |
| 6,334,385 | B1 | * | 1/2002 | Wilksch et al. ............... 91/188 |
| 6,470,791 | B1 | | 10/2002 | Welter .......................... 92/188 |
| 2002/0050425 | A1 | | 5/2002 | Iversen et al. ............. 184/6.16 |

FOREIGN PATENT DOCUMENTS

| DE | 2 043 654 | 3/1972 |
| DE | 2510957 | 9/1976 |
| GB | 1 283 204 | 7/1972 |
| JP | 55-148985 | 11/1980 |
| JP | 56-12073 | 2/1981 |
| JP | 62297503 A2 | 12/1987 |
| JP | 63029075 A2 | 2/1988 |

\* cited by examiner

*Primary Examiner*—Edward K. Look
*Assistant Examiner*—Michael Leslie
(74) *Attorney, Agent, or Firm*—McCormick, Paulding & Huber LLP

(57) ABSTRACT

The invention concerns a piston arrangement having a piston with a piston head and a piston skirt with a circumferential surface, and a connecting rod, which is connected with the piston via a ball joint comprising a ball, and penetrated by an oil supply channel, which is connected with a bearing surface of the ball joint.

13 Claims, 1 Drawing Sheet

PISTON ARRANGEMENT

CROSS REFERENCE TO RELATED APPLICATIONS

This application is entitled to the benefit of and incorporates by reference essential subject matter disclosed in German Patent Application No. 103 56 396.2 filed on Dec. 3, 2003.

FIELD OF THE INVENTION

The invention concerns a piston arrangement having a piston with a piston head and a piston skirt with a circumferential surface, and a connecting rod, which is connected with the piston via a ball joint comprising a ball, and penetrated by an oil supply channel, which is connected with a bearing surface of the ball joint.

BACKGROUND OF THE INVENTION

Such a piston arrangement is known from U.S. Pat. No. 4,070,122. On the end next to the piston, the connecting rod has a ball cup, in which the ball is inserted, being fixed at the piston head by means of a rivet. Oil flowing through the oil supply channel is then able to lubricate the contact face between the ball cup and the ball. Exactly like the piston arrangement of the present invention, the known piston arrangement is meant for use with refrigerant compressors.

JP 55-148985 A shows a further piston arrangement, in which the ball is located at the end of the connecting rod and made in one piece with the connecting rod. The oil supply channel does not only penetrate the connecting rod, but also the ball, and is connected with grooves, which are located on the surface of the ball. Through these grooves, lubricating oil can be distributed evenly in the bearing surface between the ball and the ball cup.

JP 56-012073 shows a piston arrangement, in which the ball is also made in one piece with the connecting rod. The connecting rod has a stepped oil supply channel, which expands in the direction of the piston. The steps are intended to hold the oil back during a compression stroke.

U.S. Pat. No. 6,006,652 shows a ball joint in a piston arrangement of a refrigerant compressor, in which the ball is held in a ball cup, whose end facing the connecting rod is bordered on the ball. An oil supply to the bearing surface takes place from the compression chamber through openings in the piston head or the piston skirt, respectively.

U.S. Pat. No. 4,913,001 shows a piston arrangement with a ball joint, in which the ball is also held in the ball cup by bordering a part of the piston head. In the area of the bordering, the ball cup has lateral openings, through which oil, which is sprayed into the inside of the piston, can flow to or from the ball joint, respectively.

U.S. Pat. No. 5,137,431 shows a further refrigerant compressor with a piston arrangement, whose ball joint is supplied with oil via a channel branching off from a gap between the piston skirt and the inner wall of the cylinder, in which the piston is moving.

It is an object of the present invention to improve upon or overcome the problems associated with the prior art.

SUMMARY OF THE INVENTION

The present invention is based on the task of providing a good lubrication.

The invention solves this problem in that, via an oil path, the oil supply channel is connected with a lubrication groove formed in the case surface.

With this embodiment, not only the bearing surface of the ball joint is lubricated with the oil, which is supplied through the oil supply channel. On the contrary, the oil is passed on via the oil path and reaches the lubrication groove, which is formed in the circumferential surface of the piston skirt. Here, the oil can perform two tasks. Firstly, it reduces the friction between the piston and the cylinder, when the piston is moving in the cylinder. Secondly, the oil in the lubrication groove provides an improved sealing of the compression chamber, which is delimited by the piston, so that the efficiency of the compressor, which is working with the piston arrangement, is improved.

A piston arrangement, in which oil, which is supplied through the connecting rod, also reaches a lubrication groove on the circumference of the piston, is known from DE 100 53 575 C1. Here, however, the piston is not connected with the connecting rod via a ball joint, but merely via a connecting pin. With a connecting pin it is relatively simple to lead the oil directly to the lubrication groove. In this connection, however, the oil does not flow through the piston. Further, it fixes the position of the lubrication groove. When using a ball joint, the positioning of the lubrication groove is freer. It can, for example, be displaced further in the direction of the piston rear, thus causing an extension of the sealing length.

Preferably, the ball is held in the piston by means of a fixing element, which delimits at least a part of the oil path. Thus, the interior of the piston is relatively easy to design. Complicated material shaping or working is not required to create the oil path. The oil path is made merely by the interaction of fixing element and piston, that is., piston skirt and/or piston head.

It is preferred that the fixing element has a circumferential wall, which forms, at least at a section originating from the piston head, a gap to the piston skirt, which is connected with the lubrication groove via at least one opening. Thus, it is not only achieved that the oil reaches the lubrication groove at all. The oil must also flow through a gap between the fixing element and the piston skirt. This enables the oil to take up heat occurring in the area of the piston skirt. This can, for example, be frictional heat. As the gap originates from the piston heat, the oil is also able to carry off heat from the piston head. This heat occurs during the compression of gas, particularly refrigerant gas.

Preferably, the lubrication groove is connected with an annular chamber, which is formed between piston skirt and the fixing element and closed in relation to the gap, said annular chamber being connected with the inside of the piston via an outlet opening formed in the fixing element. In this connection, the outlet opening forms a throttling point for the oil flow. This means that the pressure and the amount of the passing oil can be set by means of the size of the opening. At the same time, the oil in the annular chamber can take up heat from the piston skirt, that is, from the circumferential surface of the piston.

Preferably, the oil path has a cooling section, which extends on a side of the piston head facing the ball joint. Thus, the oil can take up the heat, where it mainly occurs, namely at the piston head. The piston head is a delimiting surface of the compression chamber, in which high temperatures occur during a compression stroke. When the oil flowing through the oil path can take up the heat here, the thermal load of the piston will be kept small. This has the advantageous effect that during operation the piston will expand less, that is, the piston can be made with more narrow tolerances in relation to the cylinder, without causing the risk that the friction will be too heavily increased. The efficiency of the compressor, which is provided with such a piston arrangement, can thus be increased in a simple manner. Further, the suction gas, which is sucked in during a suction stroke, is less heated, which will also cause an increase of the efficiency.

Preferably, the piston is made of reshaped metal sheet and the ball is supported in a bearing area of a reinforcement element, which bears on the piston head and the oil path is led through the reinforcement element. Using reshaped metal sheet for the piston permits a substantial reduction of the weight of the piston. However, a reshaped metal part, which is made of relatively thin metal sheets in the area from 0.6 to 1 mm, preferably in the area from 0.7 to 0.8 mm, is not able to adopt the partially substantial pressures, which occur during the compression of refrigerant gas. Therefore, a reinforcement element is used, which supports the piston head. With its bearing area, this reinforcement element at the same time forms a part of the bearing surface of the ball joint. When the oil path is made to pass through the reinforcement element, it is possible, in a relatively simple manner, also to let the oil get to the piston head.

It is particularly preferred that the cooling section extends between the reinforcement element and the piston head. The use of a reinforcement element makes it possible, in a particularly simple manner, to let a cooling section for the oil bear immediately on the piston head. The cooling section can be made as half-open grooves, which only have to be covered to form a section of the oil path.

It is particularly preferred that the cooling section is formed by grooves in a frontside of the reinforcement element, which bears on the piston head. The working of the frontside of the reinforcement element is relatively easily performed, as long as the reinforcement element has not been inserted in the piston. The use of reinforcement element for delimiting the cooling section causes that a working of the piston head is not required. This is particularly advantageous, when the piston head is anyway made of a relatively thin sheet metal, which would become even weaker by being provided with grooves.

Preferably, the fixing element only acts between the piston skirt and the ball. This has the advantage that the reinforcement element can position itself relatively freely during mounting. Within certain limits, it is radially displaceable in relation to the piston head. When the fixing element presses the ball into the reinforcement element, the reinforcement element centres itself automatically with regard to the ball. Further, only the centre of the reinforcement element is acted upon via the ball. Thus, it does not have to be considered that otherwise the fixing element is supported uniformly on the reinforcement element. A contact between the reinforcement element and the fixing element is not anticipated.

Preferably, the fixing element forms a surface gap with the reinforcement element, at least in a section radially outside the ball joint. Thus, the fixing element and the reinforcement element together form a further part of the oil path through the piston. Dependent on the existing pressure conditions, oil can either flow through this oil path to the ball joint from radially outside to radially inside. This situation will usually occur most frequently. Or the oil can flow from the ball joint to the radial outside, and from here reach the lubrication groove on the case surface. This has a certain importance for the balancing of bearing play between the ball and the bearing surfaces. For example, during a suction stroke, the ball is pressed against the bearing surface in the fixing element. This results in a gap between the ball and the reinforcement element, which is, however, immediately filled with oil. During the following compression stroke, this oil film serves as a damping member for the movement of the ball. Without oil, the bearing surface would wear here, and the life would be reduced.

Preferably, the surface gap has the shape of a cone section, the top of the cone pointing away from the piston head. With this embodiment, the shape of the reinforcement element is fixed. The reinforcement element has its largest thickness in the centre of the piston head. Here, also the bearing area for the ball is provided. During a compression stroke, the largest loads also occur in the centre of the piston head. When going radially further outwards, the loads are to a higher extent adopted by the piston skirt. Accordingly, a poorer support by the reinforcement element is thus required here. When the shape of the reinforcement element is adapted to the expected forces, material can be saved, and a reinforcement element with a lower weight can accordingly be used. This lower weight has a positive influence on the operation behaviour of the piston arrangement in the compressor. Particularly, it is possible to make the counter or balancing weights smaller.

Preferably, the surface gap ends in an annular gap with a larger thickness than the surface gap, which surrounds the ball and is connected with a bearing surface between the ball and the fixing element. In this annular gap, certain oil reserves can build up, by means of which also the bearing surface between the ball and the fixing element can be lubricated.

Preferably, the bearing area is made to be spherical, the bearing area having a radius, which is larger than the radius of the ball. Thus, the ball does not bear with its full surface on the reinforcement element, but small gaps occur all the time, through which oil can penetrate between the ball and the reinforcement element. This improves the lubrication.

Preferably, the fixing element is connected with the piston at the end of the piston skirt facing away from the piston head. The connection at the end prevents tensions from occurring in the area of the piston head, which could be effected by the connection. Thus, the piston can maintain a cylinder shape with a high accuracy.

It is advantageous that the end of the piston skirt has a reduced diameter. When deformations of the piston skirt occur through the connection, this will not damage the cylinder shape.

BRIEF DESCRIPTION OF THE DRAWINGS

In the following, the invention is explained in detail on the basis of a preferred embodiment in connection with the drawings, showing.

DETAILED DESCRIPTION OF THE PREFERRED EMBODIMENTS

Figure 2:
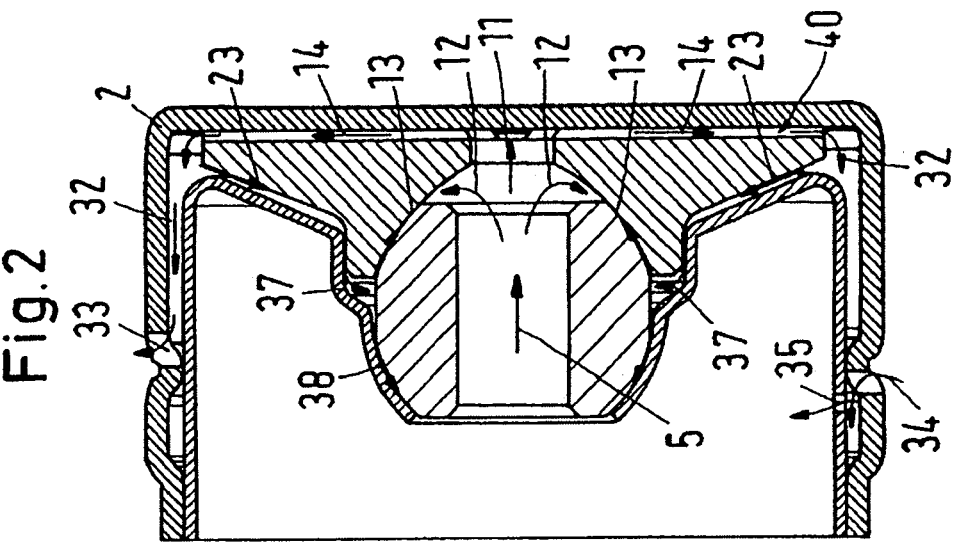
FIG. 2 is a section through a piston of the piston arrangement presenting an oil path.

A piston arrangement 1 has a piston 2 and a connecting rod 3, which is connected with the piston 2 via a ball joint 4.

The connecting rod 3 has an oil supply channel 5, which can, for example, be formed by an axial bore. The connecting rod 3 is screwed into a ball 6 (or fixed otherwise), which is a part of the ball joint 4.

The piston 2 has a piston head 7 and a piston skirt 8. The piston 2 is made as a sheet metal part, that is, it is deep-drawn of a sheet metal with a thickness of 0.7 to 0.8 mm. Thus, the piston itself is relatively light. This involves advantages, as during operation the piston must reciprocate relatively quickly. The smaller the mass of the piston is, the smaller are the forces required for acceleration, and the smaller can the balancing weights be.

The relatively thin sheet metal of the piston 2 would then not be able to stand the relatively high pressures during the compression of refrigerant. For this reason, a reinforcement element 9 is located inside the piston head 7, which has a spherical bearing area 10, in which the ball 6 is supported. The bearing area 10 has a radius, which is slightly larger than the radius of the ball.

The reinforcement element 9 has a centric bore 11, which is connected with the oil supply channel 5 via a free space 12, which is not filled by the ball 6 in the bearing area. Via the free space 12, oil can reach a contact area 13 between the ball 6 and the reinforcement element 9.

Further, the bore 11 is also connected with an oil channel 14, which is formed between the reinforcement element 9 and the piston head 7. The oil channel 14 is formed by one or more grooves in the front side of the reinforcement element 9, which bears on the piston head 7 from the inside, said grooves crossing each other preferably in the area of the bore 11.

The reinforcement element 9 has a smaller diameter than the inner diameter of the piston skirt 8. Accordingly, an annular chamber 15 exists in the circumferential direction between the reinforcement element 9 and the piston skirt 8, said chamber 15 defining a distance between the reinforcement element 9 and the piston skirt 8.

The ball 6 is held in the reinforcement element 9 by means of a fixing element 16. The fixing element 16 merely acts upon the ball. It is not connected with the reinforcement element 9.

The fixing element 16 is cup-shaped with a circumferential wall 17 and a bottom 18, which has an opening 19 for the passage of the connecting rod 3. Except for an opening 35, which will be explained later, the circumferential wall 17 is completely closed in the circumferential direction. Also the bottom is completely closed, except for the opening 19.

In its centre, the reinforcement element 9 has a cylinder section 20, which adopts the bearing area 10. A cone section 21 is adjacent to this cylinder section 20, that is, the thickness of the reinforcement element 9 is reduced radially outwards. Thus, it is considered that the central part of the piston head 7 must be better supported than its radial outer areas, as here forces can be adopted already by the piston skirt 8. The reduced thickness causes that a reinforcement element 9 with a relatively small mass can be achieved, so that also when the required parts have been mounted inside the piston, the piston remains relatively light.

Originating from the circumferential wall 17, the bottom 18 of the fixing element 16 firstly has a conical section 22, whose inclination follows that of the conical section 21 of the reinforcement element 9. Accordingly, a surface gap 23 is formed between the reinforcement element 9 and the bottom 18, said gap having the shape of a section of a cone, the peak of the cone facing away from the piston head 7. Thus, the shape of the fixing element 16 is adapted to the shape of the reinforcement element 9, to keep the oil volume as small as possible.

Adjacent to the conical section 22 is a cylinder section 24, which surrounds the cylinder section 20 of the reinforcement element 9 at a small distance, so that also here a gap occurs.

Adjacent to the cylinder section 24 is a bearing section 25, which is adapted to the shape of the ball 6, acting upon the ball 6 with a holding force.

The fixing element 16 is fixed on the piston skirt 8 from the inside, namely at an end of the piston skirt 8, which is opposite to the piston bottom 7. Here, the piston skirt 8 has a fixing area 27 with a reduced diameter. The reduction of the diameter has the advantage that the fixing element 16 can be connected with the piston 2 by means of welding or another thermal process, without risking that the piston looses its cylindrical shape, where it interacts with a cylinder. When the fixing area 27 is somewhat deformed, this plays no large role.

The piston skirt has a second diameter reduction 28, at which the fixing element 16 with its circumferential wall 17 is also connected with the piston skirt 8. On the case surface 29 of the piston 2, the diameter reduction forms a lubrication groove 30. An annular channel 31 is formed between the fixing area 27 and the diameter reduction 28 as well as the piston skirt 8 and the fixing element 16.

Together with the circumferential wall 17 of the fixing element 16, the piston skirt 8 forms an annular gap 32, which originates from the piston head. Via an opening 33, this annular gap 32 is connected with the lubrication groove 30. The lubrication groove 30 again is connected via another opening 34 with the annular channel 31. The openings 33 and 34 are located to be offset by approximately 180° in relation to each other on the circumference of the piston skirt 8, so that the lubrication oil can practically flow around the complete piston circumference. In the circumferential wall 17 of the fixing element 16 is provided an outlet opening 35, which ends in the inner chamber 36 of the piston.

Between the cylinder section 24 of the fixing element 16 and the ball 6 is provided an annular gap 37, which has a larger thickness than the surface gap 23.

Figure 1:
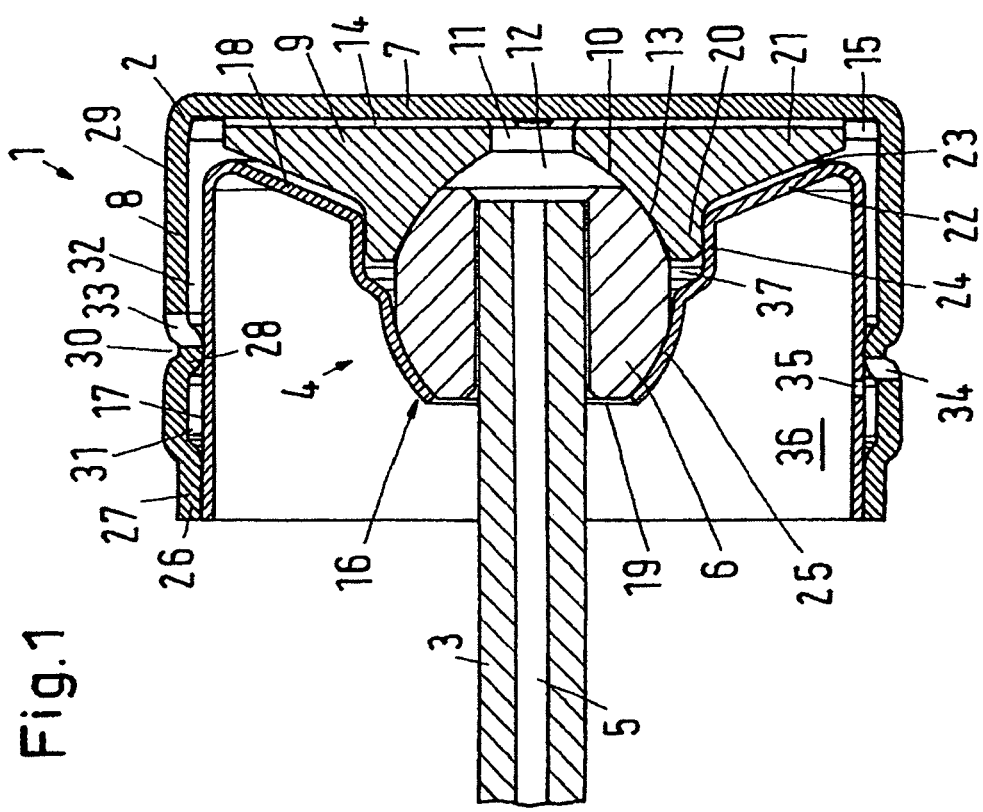
FIG. 1 is a sectional view through a piston arrangement.

By means of FIG. 2, it shall now be explained, how the oil, which is supplied through the oil inlet channel 5 through the connecting rod 3, is distributed in the piston. The oil flow is symbolised by arrows. At the arrows the reference numbers of the parts are shown, which were explained in connection with FIG. 1.

Lubrication oil is supplied to the piston 2 as known per se from the oil sump of a refrigerant compressor through the drive shaft, the crank pin and through the oil supply channel 5 in the connecting rod 3. The oil supply can be pulsating, controlled by the individual time of an overlapping of radial bores in the large connecting rod eye with a bore in the crank pin, both not shown.

The oil enters through the free space 12 into the contact area 13. A large share of the oil passes through the bore 11 into the oil channel 14 between the piston head 7 and the reinforcement element 9, and here flows radially outwards into the annular gap 32. A share of the oil flows from the annular gap 32 through the opening 33 into the lubrication groove 30 and from here through the opening 34 into the annular channel 31. From the annular channel 31 the oil flows through the outlet opening 35 into the inner chamber 36 of the piston and is distributed on the inside of the fixing element 16. The outlet opening 35 forms a throttling point for the oil flow. Thus, the pressure and the amount of the transported oil can be set by the size of this outlet opening 35.

A further share of the oil flows through the surface gap 23 and reaches the annular chamber 37 and from here into a contact area 38 between the ball 6 and the bearing section 25 of the fixing element 16.

It can be seen that the inflowing oil lubricates all mutually moving parts, thus reducing the friction. The oil can also carry off heat, particularly the heat at the piston head 7, where a cooling section 40 is formed by the oil channel 14.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A piston arrangement comprising:
   a piston with a piston head;
   a piston skirt with a circumferential surface; and
   a connecting rod, which is connected with the piston via a ball joint including a ball, and penetrated by an oil supply channel, which is connected with a bearing surface of the ball joint;
   wherein, via an oil path, the oil supply channel is connected with a lubrication groove formed in the circumferential surface;
   wherein the ball is held in the piston by means of a fixing element, which delimits at least a part of the oil path; and
   wherein the fixing element has a circumferential wall, which forms, at least at a section originating from the piston head, a gap to the piston skirt, which is connected with the lubrication groove via at least one opening.

2. The piston arrangement according to claim 1, wherein the lubrication groove is connected with an annular chamber, which is formed between the piston skirt and the fixing element and closed in relation to the gap, said annular chamber being connected with the inside of the piston via an outlet opening formed in the fixing element.

3. A piston arrangement comprising:
   a piston with a piston head;
   a piston skirt with a circumferential surface; and
   a connecting rod, which is connected with the piston via a ball joint including a ball, and penetrated by an oil supply channel, which is connected with a bearing surface of the ball joint;
   wherein, via an oil path, the oil supply channel is connected with a lubrication groove formed in the circumferential surface; and
   wherein the piston is made of reshaped metal sheet and the ball is supported in a bearing area of a reinforcement element, which bears on the piston head, and the oil path is led through the reinforcement element.

4. The piston arrangement according to claim 3, wherein the oil path has a cooling section, which extends on a side of the piston head facing the ball joint.

5. The piston arrangement according to claim 4, wherein the cooling section extends between the reinforcement element and the piston head.

6. The piston arrangement according to claim 5, wherein the cooling section is formed by grooves in a frontside of the reinforcement element, which bears on the piston head.

7. The piston arrangement according to claim 3, wherein the bearing area is made to be spherical, the bearing area having a radius, which is larger than the radius of the ball.

8. A piston arrangement comprising:
   a piston with a piston head;
   a piston skirt with a circumferential surface; and
   a connecting rod, which is connected with the piston via a ball joint including a ball, and penetrated by an oil supply channel, which is connected with a bearing surface of the ball joint;
   wherein, via an oil path, the oil supply channel is connected with a lubrication groove formed in the circumferential surface;
   wherein the ball is held in the piston by means of a fixing element, which delimits at least a part of the oil path; and
   wherein the fixing element only acts between the piston skirt and the ball.

9. A piston arrangement comprising:
   a piston with a piston head;
   a piston skirt with a circumferential surface; and
   a connecting rod, which is connected with the piston via a ball joint including a ball, and penetrated by an oil supply channel, which is connected with a bearing surface of the ball joint;
   wherein, via an oil path, the oil supply channel is connected with a lubrication groove formed in the circumferential surface; and
   wherein the ball is held in the piston by means of a fixing element, and the fixing element forms a surface gap with a reinforcement element, at least in a section radially outside the ball joint.

10. The piston arrangement according to claim 9, wherein the surface gap has the shape of a cone section, the top of the cone pointing away from the piston head.

11. The piston arrangement according to claim 9, wherein the surface gap ends in an annular gap with a larger thickness than the surface gap, which surrounds the ball and is connected with the bearing surface between the ball and the fixing element.

12. A piston arrangement comprising:
    a piston with a piston head;
    a piston skirt with a circumferential surface; and
    a connecting rod, which is connected with the piston via a ball joint including a ball, and penetrated by an oil supply channel, which is connected with a bearing surface of the ball joint;
    wherein, via an oil path, the oil supply channel is connected with a lubrication groove formed in the circumferential surface;
    wherein the ball is held in the piston by means of a fixing element, which delimits at least a part of the oil path; and
    wherein the fixing element is connected with the piston at the end of the piston skirt facing away from the piston head.

13. The piston arrangement according to claim 12, wherein the end of the piston skirt has a reduced diameter.

* * * * *